(No Model.)
S. KIMBLE.
EDUCATIONAL APPLIANCE.
No. 602,222. Patented Apr. 12, 1898.
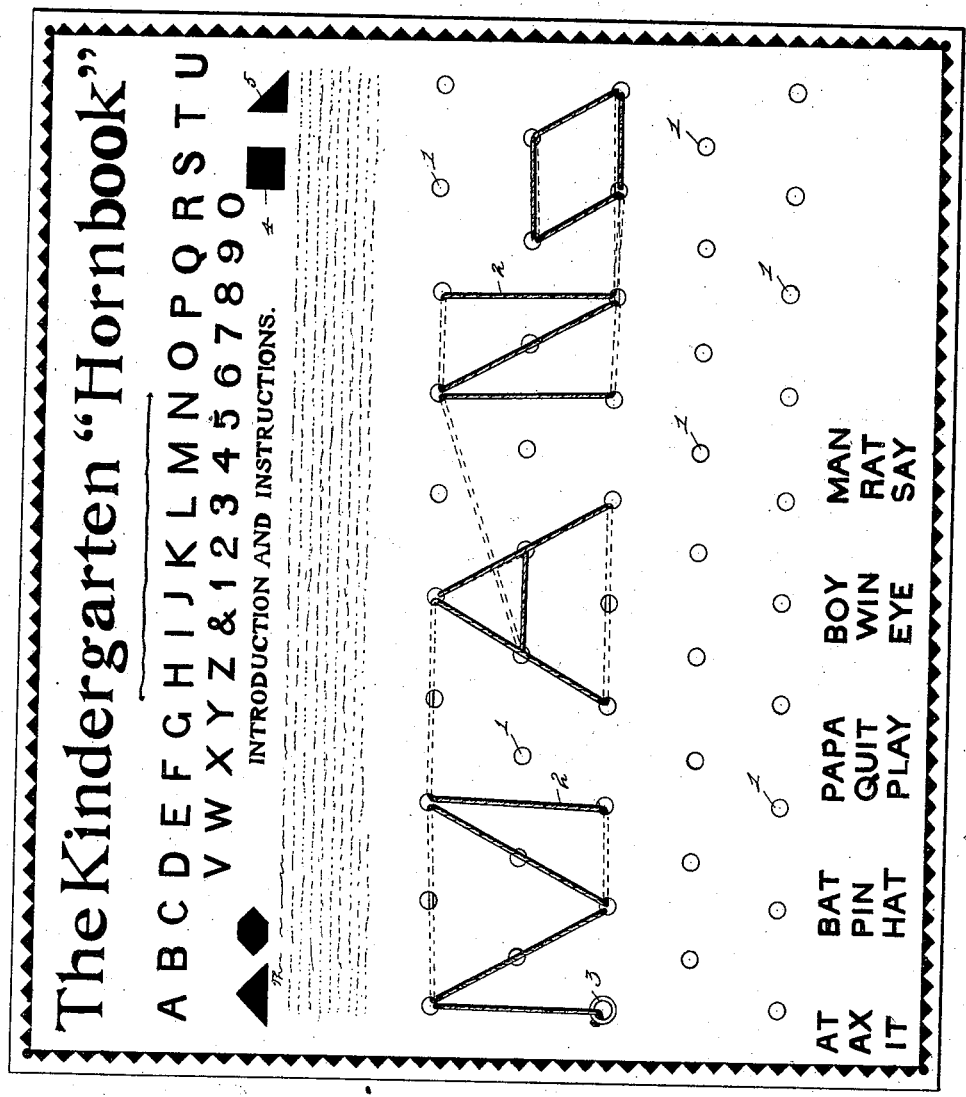
Witnesses
Inventor
Samuel Kimble.
By his Attorneys,
THE NORRIS PETERS CO., PHOTO-LITHO., WASHINGTON, D. C.

UNITED STATES PATENT OFFICE.

SAMUEL KIMBLE, OF MANHATTAN, KANSAS.

EDUCATIONAL APPLIANCE.

SPECIFICATION forming part of Letters Patent No. 602,222, dated April 12, 1898.

Application filed April 17, 1897. Serial No. 632,604. (No model.)

*To all whom it may concern:*

Be it known that I, SAMUEL KIMBLE, a citizen of the United States, residing at Manhattan, in the county of Riley and State of Kansas, have invented a new and useful Educational Appliance, of which the following is a specification.

My invention relates to educational appliances, and particularly to an apparatus designed for kindergarten work and adapted especially for instruction in the formation of letters, numerals, and the combinations thereof, in addition to providing a means of entertainment for the student.

The objects and advantages of this invention will appear in the following description, and the novel features thereof will be particularly pointed out in the appended claim.

The figure represents a face view of a device constructed in accordance with my invention.

The device embodying my invention comprises a perforated card or sheet forming a base and suitably inscribed to form samples or copies to be followed by the student and one or more flexible cords or threads adapted to be threaded through the perforations of the card or sheet, with the exposed or front portions thereof arranged to form the letters or characters of the copy, the copy, however, being arranged at a different part of the card from the perforations and entirely independent thereof, whereby the only guide to the student in forming the characters by weaving the thread or cord through the perforations is sight and the appreciation of form as conveyed by sight.

It is desirable in a device of this class not only to provide a copy to be followed by the student, but to so arrange it that it cannot be followed mechanically or without thought. Thus in practice I have found it desirable to arrange the alphabet and numerals at the top of the card, together with such instructions for the teacher as may be deemed necessary, and at the bottom of the card a series of short words or sentences adapted to serve, after the student has learned the formation of the letters, as copies in producing combinations or successions of letters constituting words and sentences. The intermediate portion of the card is provided with a series of indicating-points consisting of perforations 1, preferably arranged in parallel longitudinal lines or series, the perforations of one line of a pair being preferably arranged opposite the intervals between the perforations of the other line of said pair, whereby in transverse or vertical series the perforations are arranged on zigzag lines. The portion of the card which is perforated and is thus devoted to the operations of the student, as hereinafter fully explained, is, however, wholly devoid of lines representing characters of any kind, whereby no adjacent guide for the student is provided. The object in thus leaving the perforated portion of the card wholly blank is to increase the number of characters which can be formed within the comparatively limited space provided for that purpose, and also to prevent the pupil from following the chart mechanically and without thought as to the formation thereof. A greater impression is made upon the mind of the pupil by the necessity of considering which perforations it is necessary to connect in order to produce a certain formation of letter. In this way the formation of the letter is impressed upon the mind. The perforations in the card, as shown, are arranged at uniform distances to form equilateral triangles, hexagons, and similar geometrical figures, (the openings being arranged at the angles of such figures,) whereby the different diagonal lines of letters as well as the vertical and horizontal lines thereof may be formed and positioned properly with relation to each other.

In connection with the card constructed as above described I employ one or more flexible cords or threads 2, which are terminally attached at one end only to the card by means of eyelets 3 or their equivalents. In the drawing I have illustrated two cords or threads, one of which is threaded through suitable perforations in the card to form the word "man," while the other is loose; but it will be understood that in practice a single cord may be employed or that a greater number than two may be attached to the card, according to the extent of the perforated portion of the card. The dotted lines in the drawing represent the portions of the cord arranged in rear of the card, and thus showing the manner in which the same is carried from one perforation to another in order to produce the desired appearance upon the face of the card.

In addition to the above-named characters upon the face of the card a series of geometrical figures—such as a triangle, hexagon, and square—may be arranged in the positions indicated at 4 and 5, all of which, in addition to many others for which copy may be set by the teacher, are adapted to be formed by means of the cord and perforations, as above described.

It will be understood that while I have described and shown a perforated card as a base upon which the weaving of the flexible cord is accomplished the perforations simply serve as indicating-points between which said cord may be extended to form characters, a plurality of different characters being adapted to be formed at any part of the surface of the card by connecting different indicating-points. I desire it to be understood, therefore, that I do not limit myself to perforations as indicating-points, and that various other changes in the form, proportion, and the minor details of construction may be resorted to without departing from the spirit or sacrificing any of the advantages of this invention.

Having described my invention, what I claim is—

An educational appliance consisting of a base provided with a group of indicating-points, arranged at uniform distances apart, any three adjacent points forming an equilateral triangle and a flexible cord permanently attached at one end to the base and adapted to be extended between said indicating-points and lie upon the face of the base to form letters and other characters, different characters being adapted to be formed at the same part of the base by connecting different indicating-points, substantially as specified.

In testimony that I claim the foregoing as my own I have hereto affixed my signature in the presence of two witnesses.

SAMUEL KIMBLE.

Witnesses:
A. M. STORY,
JNO. E. HESSIR.